Figure 2:
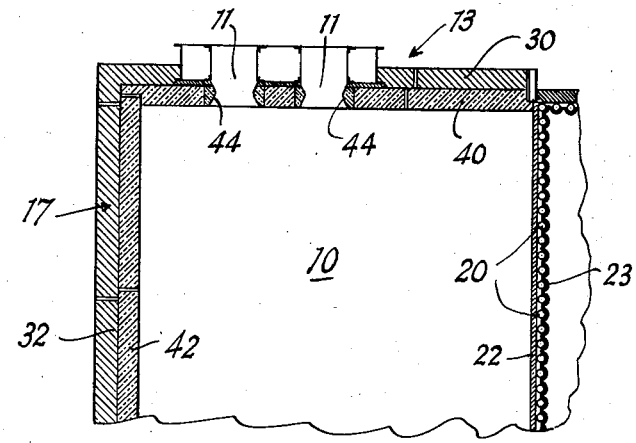

June 9, 1959  V. J. DUPLIN, JR  2,889,608
METHOD OF PROVIDING MAGNESIA ASH RESISTANT FURNACE LINING
Filed Jan. 30, 1953

INVENTOR
VICTOR J. DUPLIN, JR.
BY
ATTORNEY

2,889,608
METHOD OF PROVIDING MAGNESIA ASH RESISTANT FURNACE LINING

Victor J. Duplin, Jr., Paris, Ohio, assignor to The Babcock & Wilcox Company, New York, N.Y., a corporation of New Jersey Application January 30, 1953, Serial No. 334,235

4 Claims. (Cl. 25—155.5)

This invention relates to the refractory lining of furnaces used in apparatus for the recovery of chemicals and heat from the incineration of residual liquor resulting from the digestion of cellulosic fibrous material in the acid or sulphite wood pulping process, especially where the residual liquor contains a relatively pure magnesium base sulphite cooking liquor. More particularly, the invention is directed to an improved attack-resistant lining for a furnace used in apparatus of the type shown in L. S. Wilcoxson U.S. Patent, No. 2,619,411.

The inorganic chemicals used for cooking and contained in the residual liquor obtained in a cellulosic pulping process utilizing a relatively pure magnesium base cooking liquor can be recovered in a usable state by the incineration of the liquor. As disclosed in said patent, the residual liquor can be incinerated under controlled combustion conditions to yield an economical recovery of readily usable chemicals along with the generation of usable heat. The noncombustible magnesium compounds are recovered in a dry condition, primarily in the form of magnesium oxide, while the sulphur content is recovered in the form of sulphur dioxide. The combustible constituents of the liquor are consumed with the gaseous products of combustion releasing their heat to generate steam by absorption in a suitable heat exchanger. For the recovery of the inorganic chemicals in a usable form the combustion process must be closely controlled to effect an optimum temperature-time relationship with a regulated furnace atmosphere. To accomplish this the residual liquor is burned in suspension and the gas flow velocities through the furnace must be such as to avoid a deposition of any of the chemical solids within the higher temperature zones of the combustion chamber or the heat recovery unit. This is accomplished by admitting measured quantities of combustion air at spaced positions sequentially of the gas flow path and by providing a cross-sectional gas flow area in the apparatus, through which the gases pass, such as to insure adequate gas flow velocities. Advantageously the gases while undergoing combustion are all directed through a confined flow path of predetermined length, so that gas by-passing will not occur, with its attendant danger of over or under burning some of the inorganic chemicals in the residual liquor.

The magnesium compounds, particularly magnesium oxide or magnesia ash react with the usual refractory lining of the incineration furnace at the temperatures prevailing therein, which may be of the order of 2800° F. This reaction tends to deteriorate the refractory lining, requiring frequent replacement, which is disadvantageous because of the expense involved as well as the resulting "down-time" of the recovery apparatus. Consequently, considerable work has been done in testing various refractories to determine which is the least reactive with magnesia ash at temperatures up to 2800° F. As a result of these investigations, the refractory lining selected has generally comprised a refractory containing either 70% alumina or 80% alumina. These materials were selected because they showed the least reaction with magnesia ash at the operating temperature of the furnace. However, when furnace linings of these materials were inspected after they had been in service for some time in a recovery apparatus of the mentioned type, it was noted that the linings suffered from shelling. Investigation determined that this shelling was the result of alkali vapors present in the furnace as a result of the residual liquor incineration. The alkali penetrated refractory for distances up to ½", forming low melting point eutectics. Under these conditions, Spinel ($MgO \cdot Al_2O_3$) forms on the surface layer with a resulting expansion causing the surface to shear. When the surface of the refractory sheared off, a new surface was exposed and the alkali reaction was repeated.

In accordance with the present invention, the aforementioned deterioration of the furnace lining is inhibited, and an attack-resistant lining is provided in a novel manner. More specifically, the furnace is provided with an exposed refractory lining having a composition such as to react mildly with magnesia ash and the alkali vapors to form a liquid layer at the exposed surface of the refractory. This liquid layer tends to seal the refractory lining from further penetration by the alkali vapors. At the same time, an adhering layer of loosely bonded magnesia ash builds up to an appreciable thickness on the wet surface of the refractory. This ash, being a good thermal insulator, lowers the temperature in the refractory surface so that the liquid phase does not drain into the refractory by capillary action or down the face of the refractory by gravity. As a result, the reaction layer on the refractory surface is $\frac{1}{16}$" or less in thickness, the surface is sealed, and the refractory lining is stabilized.

Figure 1:
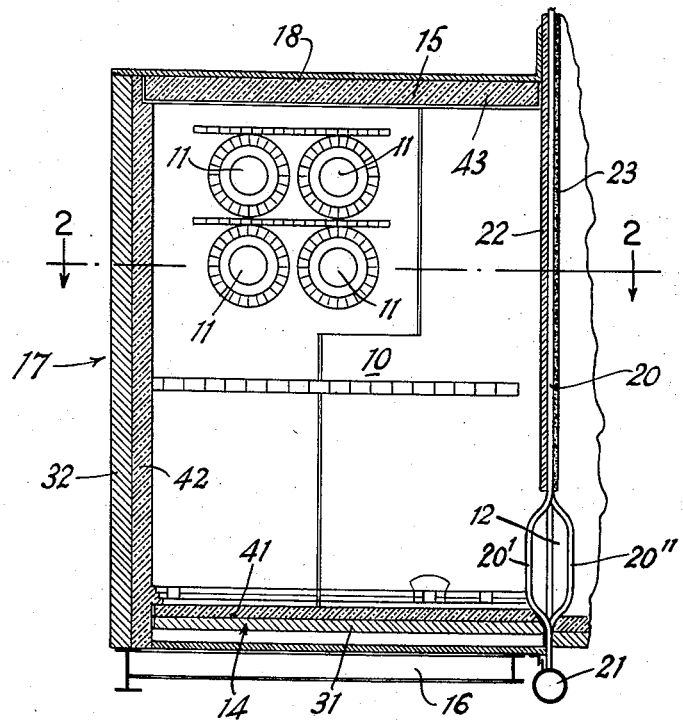

For an understanding of the invention principles, reference is made to the following description of a typical embodiment thereof as illustrated in the accompanying drawings. In the drawings:

Fig. 1 is a vertical sectional view through a residual liquor incinerating furnace forming part of a residual liquor recovery apparatus; and Fig. 2 is a horizontal sectional view on the line 2—2 of Fig. 1.

The furnace 10 illustrated in the drawing is the equivalent of and may be used in place of the furnace 11 shown in Fig. 1 of said Patent No. 2,619,411. Furnace 10 is arranged for the suspension burning of a residual liquor which is delivered thereto as a horizontally projected spray from a plurality of rotary cup burners mounted adjacent burner ports 11 in the upper opposite side walls of furnace 10 adjacent its outer end wall 17. Furnace 10 discharges the gas and entrained solids through an outlet 12 adjacent the lower portion of the inner end of the furnace.

The walls of furnace 10 are constructed of refractory material defining a combustion chamber of rectangular vertical and horizontal cross section. The opposite side walls 13 of furnace 10 are each provided with a group of four burner ports 11, so arranged that the burners associated with each side wall fire toward the burners associated with the other side wall. The furnace floor 14 is hollow, while the roof 15 may be of a suspended arch type. The furnace may be supported on suitable structural framework such as indicated at 16.

The gas discharge end wall of the furnace is formed by vertically extending spaced tubes 20, which are connected into the circulatory system of the steam generator forming part of the recovery apparatus shown and described in said patent. These tubes 20 are uniformly spaced horizontally with their lower ends opening into a transverse header 21. As shown, header 21 is spaced beneath the lower edge of outlet 12, and the row of tubes 20 enter the header in substantial alignment with the longitudinal axis of the header. At the outlet 12, alternate tubes 20' and 20" are alternately bent in opposite directions out of the plane of the vertical row of tubes to form three parallel rows providing adequate area for the flow of gases therebetween. Above the outlet 12, the tubes 20 are covered by refractory lining 22 and 23, the tubes preferably being studded to support the lining.

In accordance with the present invention, side walls 13, bottom or floor 14, and end wall 17 are formed of two layers of refractory material. The outer layer, such as 30, 31 and 32, may be of any suitable refractory material capable of acting as a support for the inner linings 40, 41 and 42. These inner linings are of a refractory capable of mildly reacting with the magnesia ash and alkali vapors to form a surface liquid phase. Lining of the same material is used for the roof, as at 43, this lining being suitably suspended from a structure 18. Also, the burner ports 11 are lined with refractory linings 44 of the same composition as the other inner linings.

The several inner linings 40–44 have a composition such as to have the described mild reaction with the magnesia ash and alkali vapor to produce the surface liquid phase which seals the refractory and provides for the build-up of the magnesia deposit. A suitable composition of the inner or exposed linings may be as follows:

| | Percent by weight |
|---|---|
| $Al_2O_3$ | 40–46 |
| $SiO_2$ | 50–55 |
| $TiO_2$ | 1.5–2.0 |
| $Fe_2O_3$ | 0.5–1.8 |
| CaO | 0.1–0.3 |
| MgO | 0.2–0.4 |
| Alkali | 0–0.3 |

Another suitable composition is the following:

| | Percent by weight |
|---|---|
| $SiO_2$ | 51.9 |
| $Al_2O_3$ | 45.1 |
| $Fe_2O_3$ | 1.4 |
| $TiO_2$ | 1.7 |
| CaO | 0.1 |
| MgO | Trace |
| $K_2O$ | 0.3 |
| | 100.5 |

A preferred composition of the refractory inner lining is the following:

| | Percent by weight |
|---|---|
| $SiO_2$ | 53.4 |
| $Al_2O_3$ | 41.2 |
| $TiO_2$ | 2.3 |
| $Fe_2O_3$ | 1.9 |
| CaO | 0.05 |
| MgO | 0.2 |
| Alkalies | 0.4 |
| | 99.45 |

Linings of the foregoing compositions, and particularly that of the immediately preceding composition, react with the alkali vapor and magnesia ash, at the exposed surface of the lining to form Kaliophilite ($K_2O \cdot Al_2O_3 \cdot 2SiO_2$) and Nepheline ($Na_2O \cdot Al_2O_3 \cdot 2SiO_2$). The liquid phase thus formed seals the surface so alkali vapor does not penetrate further into the refractory. While the major portion of the liquid phase has the above composition, some Spinel ($MgO \cdot Al_2O_3$) is included.

Magnesia ash adheres to the thus formed liquid phase up to four inches in thickness and, being a good thermal insulator, lowers the temperature of the refractory surface below the temperature to which the surface reacts with the alkali vapors. As a result, there is a very thin reaction layer immediately at the surface of the refractory and to a depth of only 1/16" or less. With the refractory thus sealed so that further reaction is inhibited, the refractory has an indefinite life.

This result may be compared with the conditions obtained when using a lining containing 70–80% alumina. With the latter lining, the reaction zone occurred from 1/4" to 1/2" inside the hot surface. The reaction of MgO and $Al_2O_3$ at the surface formed Spinel of lower density while the action of alkali inside the structure developed liquid phases which weakened the inner structure. The formation at the surface of Spinel caused an expansion and the layer sheared off at the liquid layer.

While a specific embodiment of the invention has been shown and described in detail to illustrate the application of the invention principles, it will be understood that the invention may be embodied otherwise without departing from such principles.

What is claimed is:

1. A method of providing an attack-resistant lining for a furnace used to incinerate residual liquor containing a relatively pure magnesium base sulphite cooking liquor to form dry magnesia ash and alkali vapors reactive with a refractory lining, such method comprising lining such furnace with a kaolin type refractory material having a silica content in excess of 50 percent and an alumina content less than 50 percent and mildly reactable with the vapors and ash to form a liquid layer on the exposed lining surface sealing the lining against further reaction with the vapors and forming a collecting surface for a thermally insulating layer of the ash; and incinerating said residual liquor in the furnace to form said alkali vapors to react with said refractory material and to form dry magnesia ash for deposition on said liquid layer to form such thermally insulating layer of ash.

2. A method of providing an attack-resistant lining for a furnace used to incinerate residual liquor containing a relatively pure magnesium base sulphite cooking liquor to form dry magnesia ash and alkali vapors reactive with a refractory lining, such method comprising lining such furnace with a refractory material mildly reactable with the vapors and ash to form a liquid layer on the exposed lining surface sealing the lining against further reaction with the vapors and forming a collecting surface for a thermally insulating layer of the ash; and incinerating said residual liquor in the furnace to form said alkali vapors to react with said refractory material and to form dry magnesia ash for deposition on said liquid layer to form such thermally insulating layer of ash; said refractory material having the following composition:

| | Percent by weight |
|---|---|
| $Al_2O_3$ | 40–46 |
| $SiO_2$ | 50–55 |
| $TiO_2$ | 1.5–2.0 |
| $Fe_2O_3$ | 0.5–1.8 |
| CaO | 0.1–0.3 |
| MgO | 0.2–0.4 |
| Alkali | 0–0.3 |

3. A method of providing an attack-resistant lining for a furnace used to incinerate residual liquor containing a relatively pure magnesium base sulphite cooking liquor to form dry magnesia ash and alkali vapors reactive with a refractory lining, such method comprising lining such furnace with a refractory material mildly reactable with the vapors and ash to form a liquid layer on the exposed lining surface sealing the lining against further reaction with the vapors and forming a collecting surface for a thermally insulating layer of the ash; and incinerating said residual liquor in the furnace to form said alkali vapors to react with said refractory material and to form dry magnesia ash for deposition on said liquid layer to form such thermally insulating layer of ash; said refractory material having the following composition:

| | Percent by weight |
|---|---|
| $SiO_2$ | 51.9 |
| $Al_2O_3$ | 45.1 |
| $Fe_2O_3$ | 1.4 |
| $TiO_2$ | 1.7 |
| CaO | 0.1 |
| MgO | Trace |
| $K_2O$ | 0.3 |
| | 100.5 |

4. A method of providing at attack-resistant lining for a furnace used to incinerate residual liquor containing a relatively pure magnesium base sulphite cooking liquor to form dry magnesia ash and alkali vapors reactive with a refractory lining, such method comprising lining such furnace with a refractory material mildly reactable with the vapors and ash to form a liquid layer on the exposed lining surface sealing the lining against further reaction with the vapors and forming a collecting surface for a thermally insulating layer of the ash; and incinerating said residual liquor in the furnace to form said alkali vapors to react with said refractory material and to form dry magnesia ash for deposition on said liquid layer to form such thermally insulating layer of ash; said refractory material having the following composition:

| | Percent by weight |
|---|---|
| $SiO_2$ | 53.4 |
| $Al_2O_3$ | 41.2 |
| $TiO_2$ | 2.3 |
| $Fe_2O_3$ | 1.9 |
| CaO | 0.05 |
| MgO | 0.2 |
| Alkalies | 0.4 |
| | 99.45 |

References Cited in the file of this patent

UNITED STATES PATENTS 2,070,632 Tomlinson _____ Feb. 16, 1937

FOREIGN PATENTS

Searle: Refractory Materials, 3rd ed., 1950, pp. 27 and 673.